(12) United States Patent
Bailey

(10) Patent No.: US 6,557,190 B2
(45) Date of Patent: May 6, 2003

(54) STORABLE BED ASSEMBLY

(75) Inventor: Charles L. Bailey, Riverside, CA (US)

(73) Assignee: National RV Holdings, Inc., Pairs, CA (US)

( * ) Notice: Subject to any disclaimer, the term of this patent is extended or adjusted under 35 U.S.C. 154(b) by 0 days.

(21) Appl. No.: 09/945,400

(22) Filed: Aug. 31, 2001

(65) Prior Publication Data

US 2003/0041377 A1 Mar. 6, 2003

(51) Int. Cl.⁷ .................................................. B60P 3/38
(52) U.S. Cl. ...................................... 5/118; 296/190.02
(58) Field of Search .................. 5/118, 11; 296/190.02, 296/24.1; 211/35; 114/192, 193

(56) References Cited

U.S. PATENT DOCUMENTS

| | | | |
|---|---|---|---|
| 3,266,062 A | 8/1966 | Rogers | |
| 3,480,975 A | 12/1969 | Racine et al. | |
| 3,623,168 A | * 11/1971 | Rouch | 5/10.1 |
| 4,005,898 A | * 2/1977 | Way | 108/117 |
| 4,766,623 A | * 8/1988 | Beihoffer et al. | 5/136 |
| 4,837,877 A | * 6/1989 | Hamada et al. | 5/10.2 |
| 5,461,735 A | 10/1995 | Danton | 5/10.2 |
| 5,638,559 A | 6/1997 | Natri et al. | 5/10.2 |
| 5,984,404 A | 11/1999 | Novoa et al. | 296/190.02 |
| 6,231,114 B1 | 5/2001 | Warmoth | 296/170 |

* cited by examiner

*Primary Examiner*—Heather Shackelford
*Assistant Examiner*—Lisa M. Saldano
(74) *Attorney, Agent, or Firm*—Oppenheimer Wolff & Donnelly LLP; Alan C. Rose; Joel D. Voelzke

(57) ABSTRACT

A storable bed assembly primarily for recreational vehicles permits the lowering and raising of the bed using a pair of rear guides fixed to a wall of the recreational vehicle, and a pair of swing arm guides at the front corners of the bed frame. Linkages are provided to couple the corners of the bed frame to the guides. Counterbalancing springs in the form of compressed gas cylinders are provided to assist in raising the bed assembly to the stored position.

20 Claims, 5 Drawing Sheets

STORABLE BED ASSEMBLY

BACKGROUND OF THE INVENTION

This invention relates to movable bed assemblies, primarily for use in limited space facilities such as travel trailers.

Various arrangements have been proposed heretofore for shifting beds from a stored overhead position where the bed is out of the way, to a lower position where the bed is to be used for sleeping. Representative prior art arrangements of this type are shown in U.S. Pat. Nos. 6,231,114B1, 3,266,062, 3,623,168, and 3,829,907.

However, these prior proposed arrangements have significant shortcomings in that they may be unduly complicated, inconvenient to use, or may require considerable care by the user to avoid possible injury.

INVENTION SUMMARY

Accordingly, objects of the invention include simplicity, convenience, and design safety so that the bed may be easily raised and lowered without danger of injury to the user.

In one exemplary embodiment illustrating the principles of the invention, a travel trailer includes a bed mounted at one end of said trailer with the rear of the bed mounted against one side wall of said trailer, and sides of the bed being adjacent the two side walls of the trailer. The bed may include a mattress and a frame; and the rear of the frame is mounted on two substantially vertical rear guides. Toward the front of the bed frame, linkages are provided which slidably engage swing arms to permit lowering and raising of the bed. The swing arms are pivotally mounted to the sides of the trailer, and have lower end points which arrest downward movement of the front of the bed frame. Resilient counterbalancing arrangements are provided, which are compressed when the bed is shifted to its lower position, and which assist in shifting the bed and frame to its upper stored position.

The counterbalancing arrangements may involve compressed air or gas, or elongated springs; and may be combined with the slides and swing arms, or may be separate therefrom.

The swing arms may include front guides; and the linkages mounted near the corners of the bed frame may each have a pair of rollers which are trapped within the guides.

The storable bed assembly may also be employed in other applications, including other recreational vehicle applications such as motor homes or campers.

The counterbalancing arrangements may be in the form of gas springs, or coil springs, for examples.

Advantages of the invention include improved safety and convenience in lowering and raising the bed. For example, the front of the bed may be provided with a handle to pull the front of the bed down; and then pressing on the surface of the bed will lower the back of the bed so that it is in the lower sleeping configuration.

Other objects, features and advantages of the invention will become apparent from a consideration of the following detail description and the accompanying drawings.

DETAILED DESCRIPTION OF THE PREFERRED EMBODIMENTS

Figure 1:
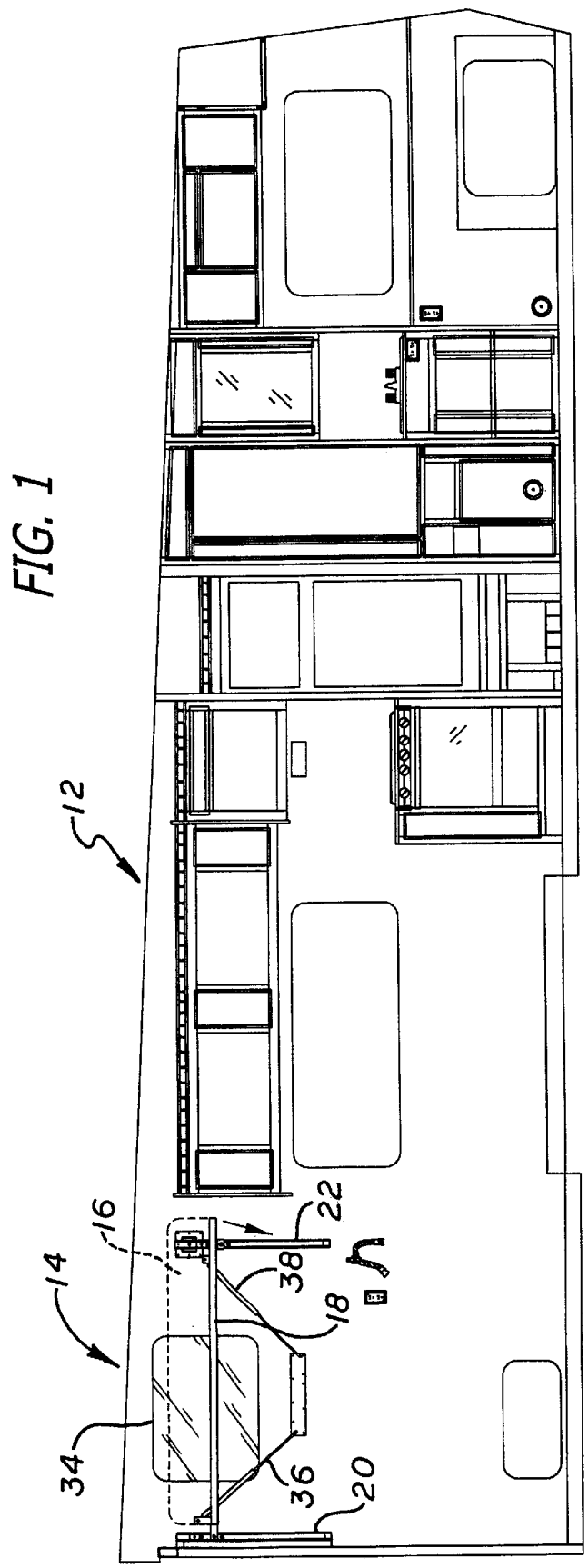
FIG. 1 is a side cross-sectional view of a recreational vehicle showing one typical location for a pull-down bed illustrating the principles of the invention.

Referring now to FIG. 1 of the drawings, an overall view of a trailer body 12 is presented, with a storable bed 14 being shown mounted at the rear of the trailer, with the bed 14 in the raised stored position. With regard to the storable bed 14, it includes a mattress 16 and a bed frame 18. FIG. 1 also shows a pair of rear vertical guides or tracks 20, and a pair of front swing arms 22, each of which also includes a guide or track.

In FIG. 1 of the drawings, the bed 14 was shown in its upper or fully stored position, where it is out of the way so that the space underneath the bed 14 may be used. When it is desired to use the bed, it is lowered in two steps. As the first step, shown in FIG. 2, the front of the bed is shifted downward until the linkages 24 secured to the front sides of the bed engage stop members 26 toward the bottom of the swing arm guides 22, thus defining the lower position of the front of the bed.

Figure 2:
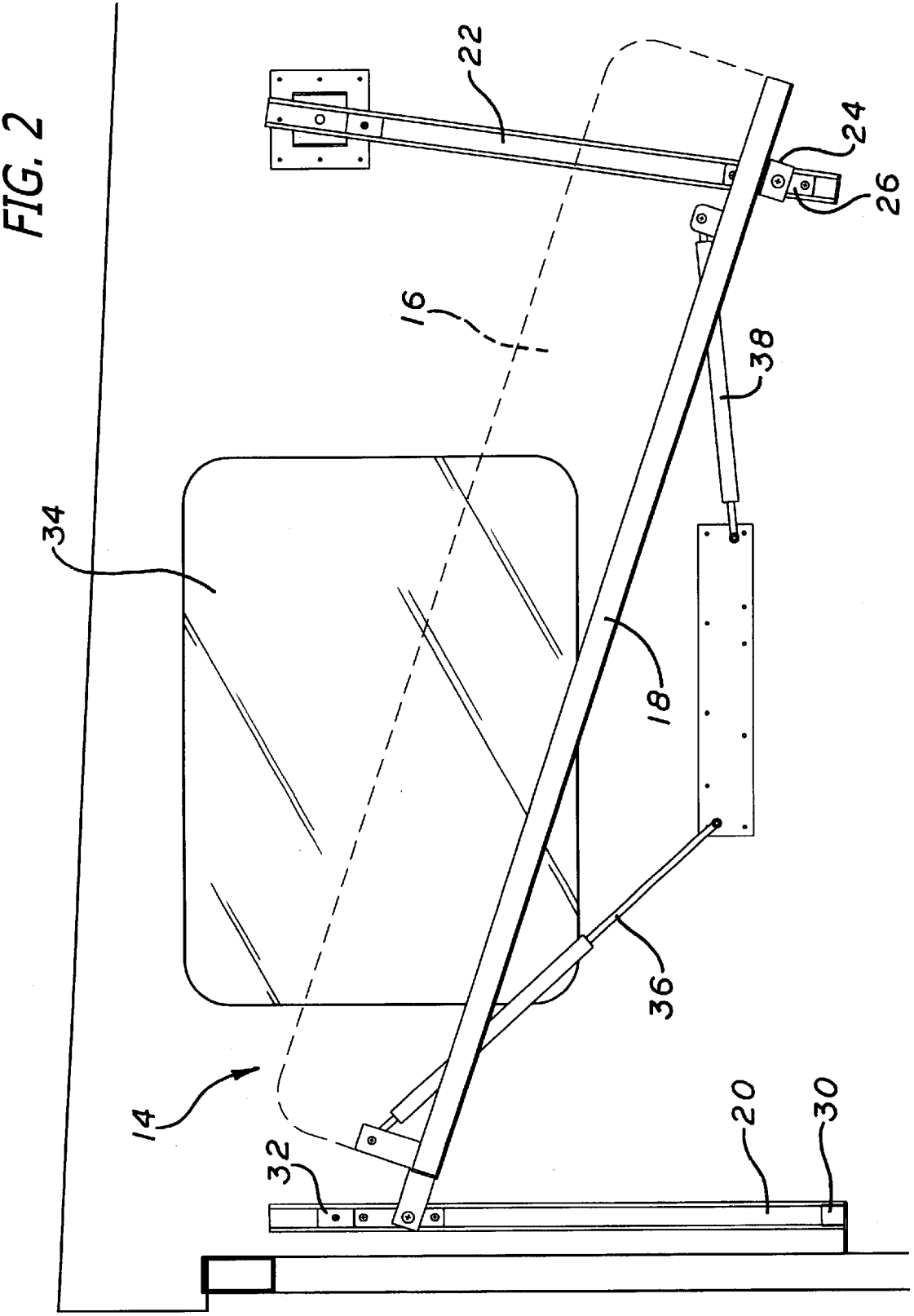
FIG. 2 is diagramatic side view of a pull-down bed illustrating the principles of the invention with the front of the bed having been shifted downward.
Figure 3:
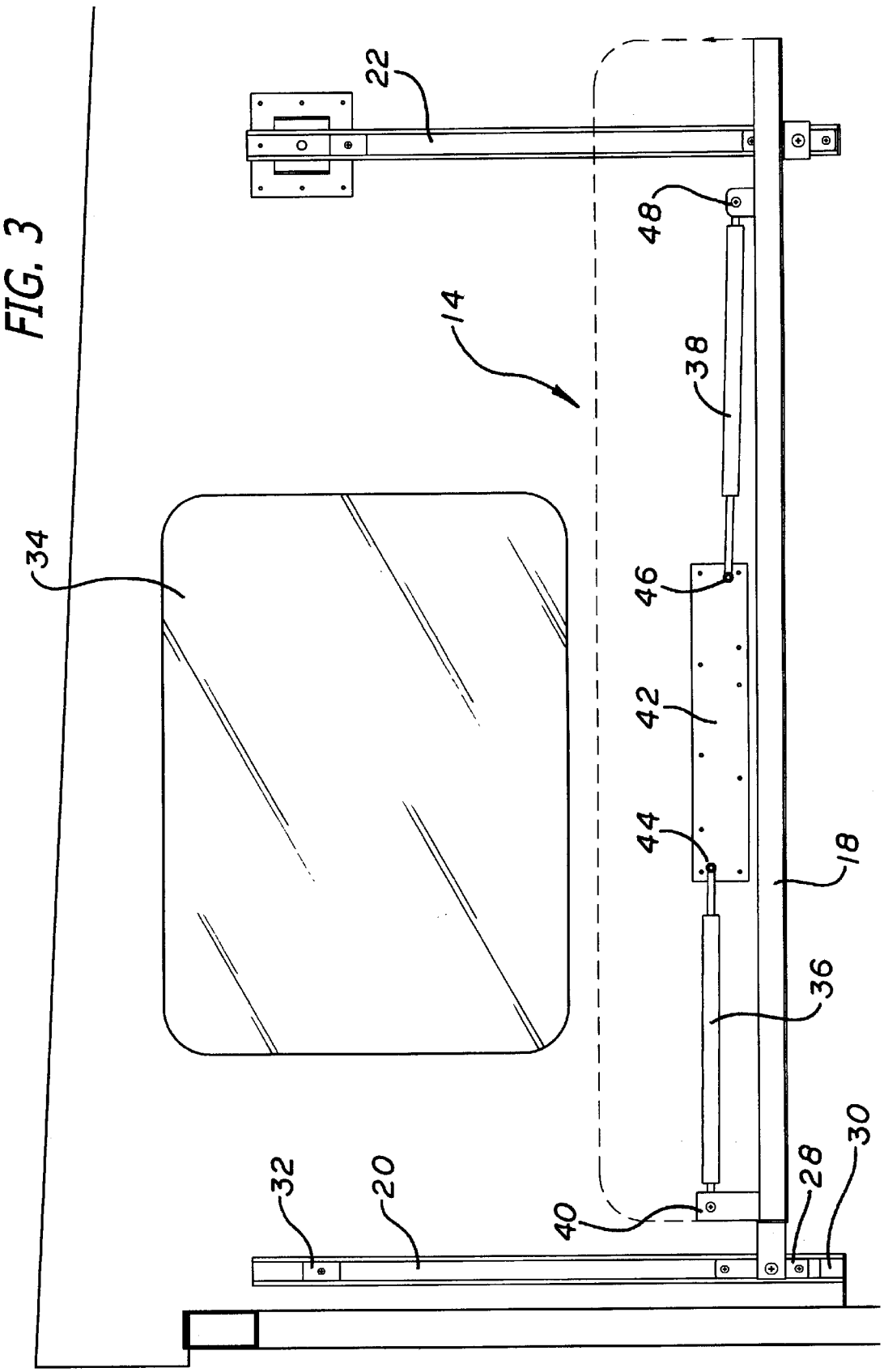
FIG. 3 is a side view similar to that of FIG. 2, but with both the front and the rear of the bed having been shifted downward.

The showing of FIG. 3 illustrates the bed 14 in its lower position, ready for use as a regular bed for people to sleep on. In this showing of FIG. 3, one of the rear linkages 28 is shown engaging a stop 30 to define the lower position of the rear of the bed. Also shown in FIG. 3 is the upper stop 32 which defines the upper or stored position of the bed frame, when the linkage 28 secured to the bed frame 18 engages this top stop 32. The rounded rectangle 34 as shown in FIGS. 1, 2 and 3 is merely a window in the side of the trailer.

Also shown in FIGS. 1, 2 and 3 are the spring struts 36 and 38 which are compressed when the bed is lowered, and which provide upward force that is desired to return the bed to the stored position. This strut 36 is secured to the bed frame at point 40 and to a fixed reinforcing panel 42 at pivot point 44. Similarly, the front strut 38 is secured to the support plate 42 at point 46 and to the bed frame at point 48. Four gas compression spring struts are employed, two on each side of the bed. These gas springs may for example be Part No. GR12.2M-90 made by CBOL Corporation, and they are available from Newport Engineering Associates, Inc., 2950 Airway Avenue, Suite A12, Costa Mesa, Calif. 92626-5031.

Although gas struts as described hereinabove are preferred, other types of counterbalancing arrangements, such as coil springs, may be used. In addition, if desired, the counterbalancing arrangements may be combined with the guides, so that as the linkage 28 moves downward, a coil spring or gas compression cylinder within the guide, may be compressed, for subsequent release and expansion when it is desired to move the bed to the storage position.

Figure 4:
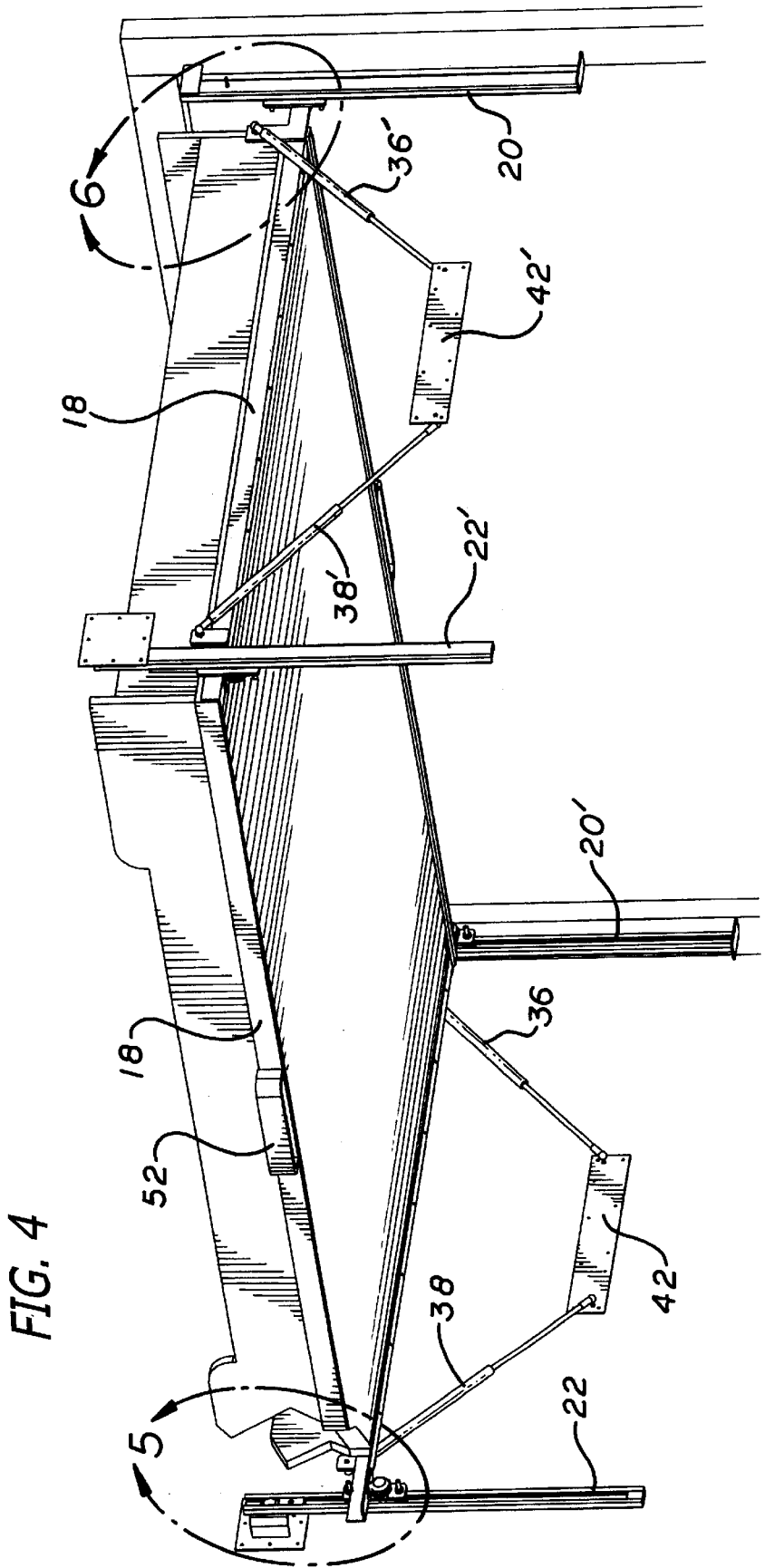
FIG. 4 is a cutaway schematic perspective view of the bed frame and the four vertical guides which permit easy lowering and raising of the bed.

Reference will now be made to FIG. 4 of the drawing which is a bottom perspective view showing the bed frame, the gas struts and the four guides, in this partially cutaway view. Thus, note that the two front swing arm guide rails 22 and 22' pivotally mounted to the side walls; and the handle 52 in the foreground which is employed to pull the front of the bed down. Note that the two rear guide rails 20 and 20' are mounted on the rear wall of the trailer, and the guide 20' is the furthest away from the viewer when looking at FIG. 4.

Figure 5:
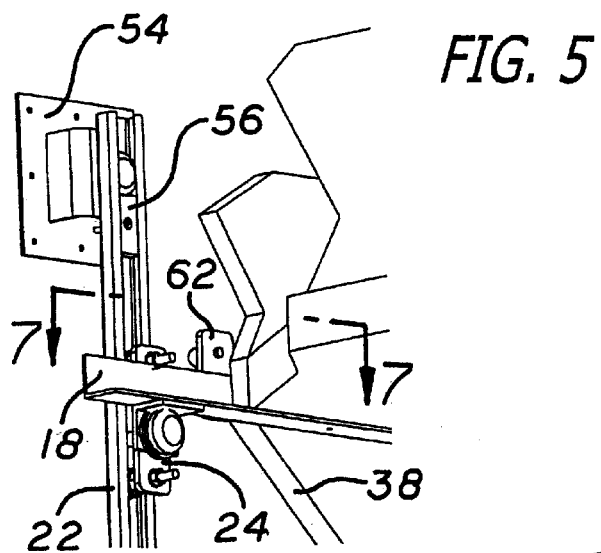
FIG. 5 is an enlarged showing of the portion of the drawing of FIG. 4 indicated by the number "5", referring to a circle in FIG. 4.
Figure 7:
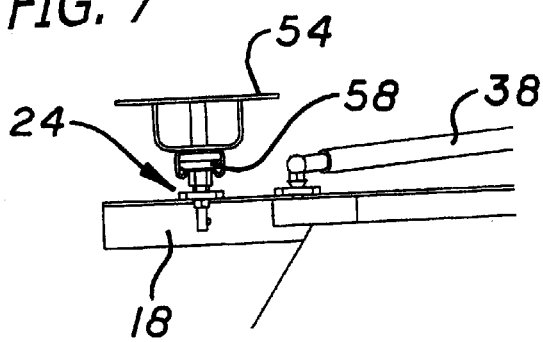
FIG. 7 is a top view of the front corner of the bed.

It is useful to note that the drawing of FIG. 5 corresponds to the dash dot oval "5" of FIG. 4 and shows in greater detail the construction of the linkage between the front of the bed frame 18 and the swing arm or guide 22. Note that the L shape angle iron is part of the bed frame 18. The swing arm guide 22 is pivotally mounted to the wall of the trailer by the plate 54, and the rubber stop 56 serves to define the upper position of the bed frame when the linkage 24 engages the stop 56. FIG. 7 is helpful in showing the upper plate 54 and the roller 58 which is one of two rollers forming part of the linkage 24 for the front of the bed. Also shown in FIG. 5 is one end of the strut 38 which is coupled to the front of the bed frame 18 through the bracket 62.

Figure 6:
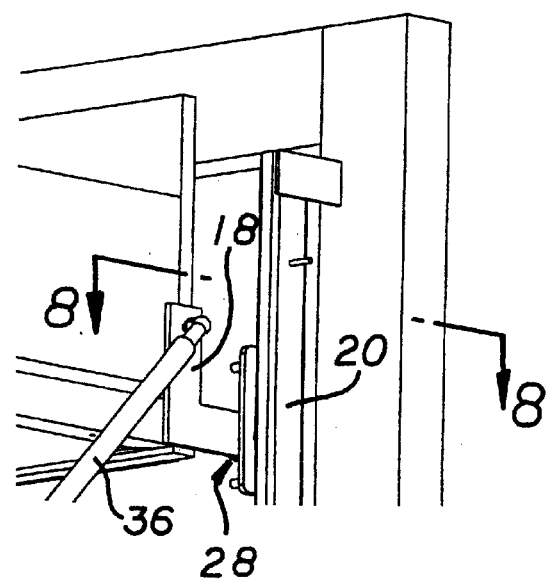
FIG. 6 is a detailed and enlarged showing of the portion of FIG. 4 indicated by the dash, dot circle "6" of FIG. 4.
Figure 8:
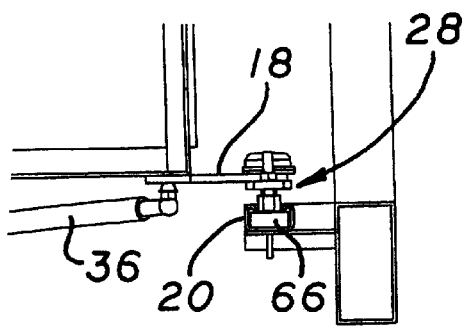
FIG. 8 is a top view of one of the rear corners of the bed that is shown in FIG. 6.

FIG. 6 is an enlarged showing of the rear guide 20 and the linkage 28 coupling the bed frame 18 to the rear guide track 20. Also shown in FIG. 6 is the rear end of the strut 36. FIG. 8 is a top view of the rear guide rail 20, an extension of the bed frame 18 and the spring strut 36. The roller 66 forms a part of the linkage 28 by which the rear of the bed frame 18 is mounted to the rear guides or tracks 20.

In conclusion, in the foregoing detailed description, one illustrative embodiment of the invention has been disclosed and shown in the drawings. It is to be understood, however, that various modifications and changes may be made without departing from the spirit and scope of the invention. Thus, by way of example and not of limitation, instead of the front guides being pivoted and the rear guides being fixed, the front guides may be fixed and the rear guides arranged to pivot forward, as the front of the bed is lowered. Then, as the rear of the bed is brought down, the rear guides would pivot back to the fully vertical position. It is also noted that instead of rollers within tracks, the pivoted swing arms may be in rod form with the linkages extending around the rods. Also, as mentioned above, the spring struts may involve coil springs for example, instead of the gas strut arrangements as disclosed in detail hereinabove. As another alternative, the front guides may be fixed but arcuate in configuration to conform to the arcuate path of the front linkages as the front of the bed is pivoted down, while the back of the bed remains at the upper level; and the fixed front tracks may then have a short lower horizontal section to permit forward movement of the front linkages as the rear of the bed is brought down. Accordingly, the present invention is not limited to the specific embodiments described in detail and disclosed in the present drawings.

What is claimed is:

1. A bed assembly involving shifting a bed between an upper stored position and a lower position for sleeping, comprising:

a frame for supporting a mattress capable of being shifted between the upper stored and lower positions; said frame having a front and a back;

the back of said frame being mounted to a wall with two spaced vertically extending rear guides, said guides having a closed lower end position for limiting downward movement of the rear of said frame;

a pair of swing arms pivotally mounted to rigid supports adjacent the upper stored position of said frame with said arms engaging linkages coupled to the front of said frame on either side of the frame;

said swing arms including arrangements permitting movement of said linkages along said swing arms from said upper stored position to a lower closed end position preventing further downward movement of said linkages, said swing arms rotating as one edge of said bed is lowered from said upper stored position toward said lower closed end position;

resilient counterbalancing arrangements which are compressed when said mattress and frame are shifted downward, and which apply upward force to assist in restoring said mattress and frame to the upper stored position.

2. An assembly as defined in claim 1 wherein said assembly is mounted in a recreational vehicle, with said wall being one wall of said recreational vehicle, and said swing arm supports being mounted on two additional walls of said recreational vehicle.

3. An assembly as defined in claim 2 wherein said recreational vehicle is a travel trailer.

4. An assembly as defined in claim 1 wherein said counterbalancing arrangements include four compressed gas cylinders, with each cylinder having one end secured to said frame near a corner thereof, and the other end thereof pivotally secured to a fixed support.

5. An assembly as defined in claim 1 wherein said linkages each include a pair of rollers, and wherein said swing arms include a longitudinally extending front guides trapping said rollers within the guides for substantially vertical movement as said bed is raised or lowered.

6. A bed assembly as defined in claim 1 wherein the back of said frame has a pair of linkages thereon each including a pair of rollers which are trapped within said rear guides for vertical movement as said bed is raised or lowered.

7. An assembly as defined in claim 1 wherein said resilient counterbalancing arrangements include four springs.

8. A bed assembly involving shifting a bed between an upper stored position and a lower position for sleeping, comprising:

a frame for supporting a mattress capable of being shifted between the upper stored and lower positions; said frame having a front and a back;

the back of said frame being mounted to a wall with two spaced vertically extending rear guides, said guides having a closed lower end position for limiting downward movement of the rear of said frame;

a pair of movable front guides mounted to rigid supports adjacent the front of said frame with said movable front guides engaging linkages coupled to the front of said frame on either side of the frame, said front guides being movable while said frame is being tilted and lowered to provide guidance for said frame;

said front guides including arrangements permitting movement of said linkages along said guides from said upper stored position to a lower closed end position preventing further downward movement of said linkages; and resilient counterbalancing arrangements which are compressed when said mattress and frame are shifted downward, and which apply upward force to assist in restoring said mattress and frame to the upper stored position.

9. An assembly as defined in claim 8 wherein said assembly is mounted in a recreational vehicle, with said wall being one wall of said recreational vehicle, and said movable front guides being mounted on two additional walls of said recreational vehicle.

10. An assembly as defined in claim 9 wherein said recreational vehicle is a travel trailer.

11. An assembly as defined in claim 8 wherein said counterbalancing arrangements include four compressed gas cylinders, with each cylinder having one end secured to said frame near a corner thereof, and the other end thereof pivotally secured to a fixed support.

12. A bed assembly as defined in claim 8 wherein said movable front guides are pivotally mounted to a fixed support adjacent the front of the bed.

13. A bed assembly involving shifting a bed between an upper stored position and a lower position for sleeping, comprising:

a frame for supporting a mattress; said frame having a front and a back;

the back of said frame being mounted to a wall with a first pair of substantially vertically extending rear guides, said guides having a closed lower end position for limiting downward movement of the rear of said frame;

the front of said frame being mounted to a second pair of substantially vertically extending front guides, said guides having a lower end position for limiting downward movement of the front of said frame;

one of said pairs of guides being pivotally mounted to a fixed support, said one of said pair of guides pivoting as a part of said frame is being shifted vertically; and resilient counterbalancing arrangements which are compressed when said mattress and frame are shifted downward, and which apply upward force to assist in restoring said mattress and frame to the upper stored position.

14. A bed assembly as defined in claim 13 wherein the rear guides are fixed and the front guides are pivotally mounted.

15. An assembly as defined in claim 13 wherein said guides are mounted to the walls of a recreational vehicle.

16. A bed assembly involving shifting a bed between an upper stored position and a lower position for sleeping, comprising:

a frame for supporting a mattress; said frame having a front and a back;

the back of said frame being mounted to a wall with a first pair of substantially vertically extending rear guides, said rear guides having a closed lower end position for limiting downward movement of the rear of said frame;

the front of said frame being mounted to a second pair of front guides, said front guides having a lower end position for limiting downward movement of the front of said frame;

said front guides accommodating movement of the front of the bed frame downward while the rear of said bed frame remains elevated, and subsequently accommodating forward movement of the front of said frame as the rear of said frame is lowered; and resilient counterbalancing arrangements which are compressed when said mattress and frame are shifted downward, and which apply upward force to assist in restoring said mattress and frame to the upper stored position.

17. A bed assembly as defined in claim 16 wherein the rear guides are fixed and the front guides are pivotally mounted.

18. An assembly as defined in claim 16 wherein said guides are mounted to the walls of a recreational vehicle.

19. An assembly as defined in claim 16 wherein said counterbalancing arrangements include four compressed gas cylinders, with each cylinder having one end secured to said frame near a corner thereof, and the other end thereof pivotally secured to a fixed support.

20. A bed assembly as defined in claim 16 wherein the corners of said bed frame are coupled to said guides with linkages, with each linkage including a pair of rollers trapped to longitudinal movement within said guides.

* * * * *